Figure 1:
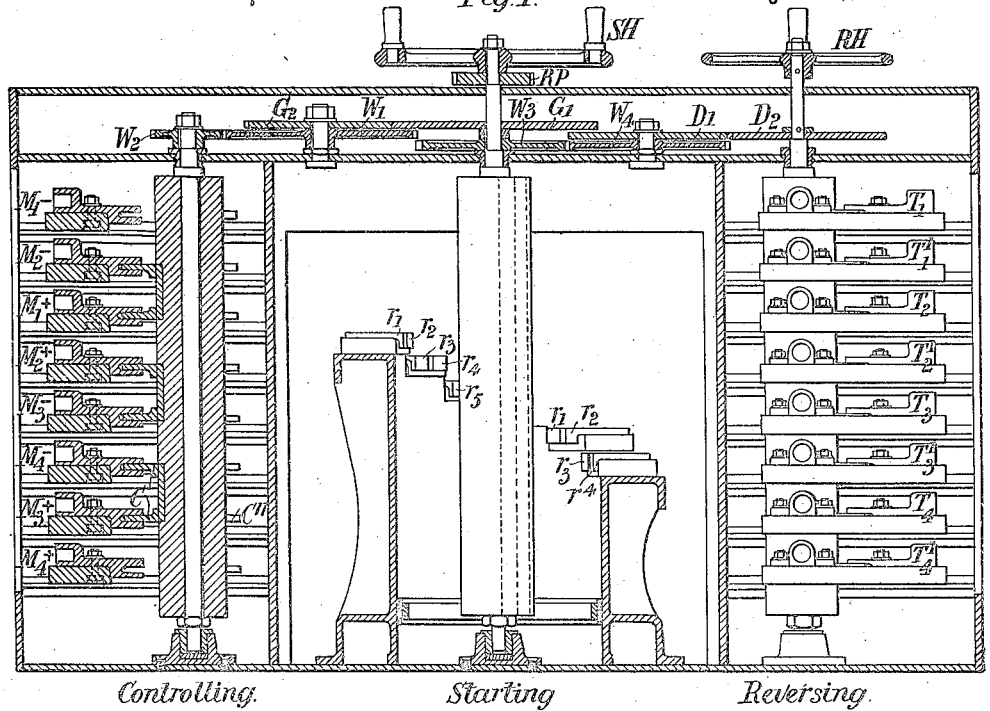

(No Model.) 3 Sheets—Sheet 1.

A. T. SNELL & C. E. GROVE.
ELECTRIC SWITCH FOR USE WITH ELECTRICALLY PROPELLED VEHICLES OR LOCOMOTIVES, &c.

No. 605,023. Patented May 31, 1898.

Witnesses. Inventors.

(No Model.) 3 Sheets—Sheet 2.

A. T. SNELL & C. E. GROVE.
ELECTRIC SWITCH FOR USE WITH ELECTRICALLY PROPELLED VEHICLES OR LOCOMOTIVES, &c.

No. 605,023. Patented May 31, 1898.

Witnesses.
Inventors.

(No Model.) 3 Sheets—Sheet 3.
A. T. SNELL & C. E. GROVE.
ELECTRIC SWITCH FOR USE WITH ELECTRICALLY PROPELLED VEHICLES OR LOCOMOTIVES, &c.
No. 605,023. Patented May 31, 1898.
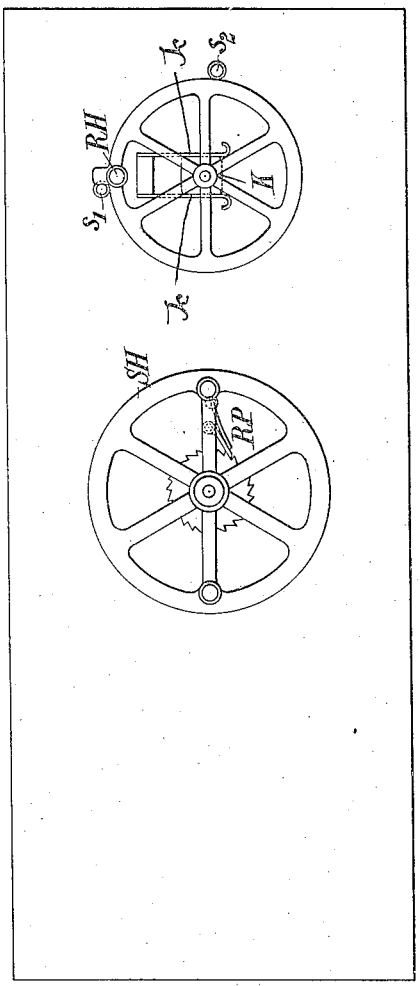
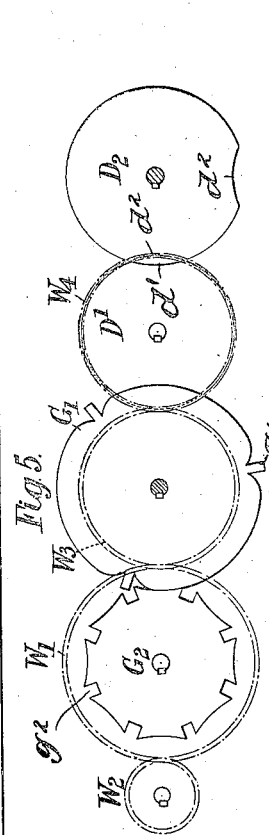
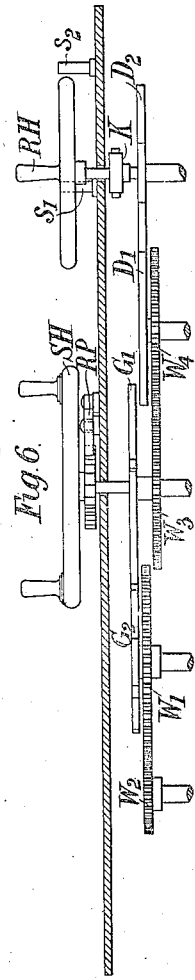
Witnesses. Inventors.

UNITED STATES PATENT OFFICE.

ALBION THOMAS SNELL AND CHARLES EDWARD GROVE, OF LONDON, ENGLAND, ASSIGNORS OF ONE-THIRD TO ARNOLD FRANK HILLS, OF SAME PLACE.

ELECTRIC SWITCH FOR USE WITH ELECTRICALLY-PROPELLED VEHICLES OR LOCOMOTIVES, &c.

SPECIFICATION forming part of Letters Patent No. 605,023, dated May 31, 1898.

Application filed October 8, 1897. Serial No. 654,586. (No model.)

*To all whom it may concern:*

Be it known that we, ALBION THOMAS SNELL and CHARLES EDWARD GROVE, subjects of the Queen of Great Britain, residing at London, England, have invented new and useful Improvements in Electric Switches for Use in Connection with Electrically-Propelled Vehicles or Locomotives and for other Purposes, of which the following is a specification.

Our invention relates to electrical switches for use upon railways in connection with electrically-propelled vehicles and locomotives.

In locomotives or vehicles upon electric railways or tramways carrying two, three, four, or more electric motors it is usual to provide a switch or series of switches with resistances or the like by means of which the supply of electric current to the motors may be established or cut off, the speed of the motors may be regulated, and the direction of running may be controlled. In some cases it is desirable to provide in addition means by which the mode of coupling of the motors may be varied—as, for instance, in cases where two motors are used—to enable them to be coupled either in series or in parallel at will.

Our invention consists in the construction and use of a compound switch or series of interlocked switches especially adapted for controlling four electric motors, as hereinafter described, but applicable also with simple modifications to the controlling of groups of two, three, or more electric motors. We prefer to use three switches in combination. One of them, which may be called the "starting-switch," controls the supply of current to the motors or motor-armatures by connecting them through a suitable resistance to the source of supply, the resistance being more or less cut out as the motors attain speed and being reinserted and the circuit afterward broken when it is desired to stop. The second switch, which may be called the "controlling-switch," varies the mode of coupling of the motors or motor-armatures, so that they may be coupled in any of the three ways—*i. e.*, (*a*) all four in series; (*b*) in two parallel groupings of two in series each; (*c*) all four in parallel. The third switch, which may be called the "reversing-switch," reverses the connections of the fields or armatures of the motors with the source of supply, thereby determining the direction of rotation of the motor-armatures, and consequently the direction of motion of the locomotive or vehicle. These three switches are interlocked, so that the effects required to be produced by them shall be produced in an invariable cycle and it shall be impossible for the motorman to operate the switches in such a way as to cause injury to the motors. Thus current cannot be put into the motor-armatures by the starting-switch when the motors are at rest unless the reversing-switch is properly set to correspond with either the forward or backward direction of running, and the controlling-switch is set so as to connect the motors four in series. Contact is made and current admitted to the armatures for the purpose of starting the locomotive or motor-vehicle by rotating the handle of the starting-switch which connects the mains to the motors through suitable resistances, these resistances being gradually cut out as the handle is further rotated. At a given point in the cycle current is cut off by the starting-switch and the connections of the motors are changed by the controlling-switch from the combination of four in series to the next combination of two in series and two in parallel. The circuit is again established by the starting-switch through resistance, and as the starting-switch handle is further rotated this resistance is again gradually cut out. At another given point in the cycle the controlling-switch changes the motors from the combination of two in series and two in parallel to the next combination of four in parallel, and resistance is again inserted and again gradually cut out. Finally, the circuit is broken and the motors connected four in series ready for the next start, the whole cycle being performed by one complete revolution of the starting-switch handle. The resistances may be reinserted before each break of the main circuit, if desired.

We prefer to arrange that the starting-switch shall break circuit just before the controlling-switch changes the motor connections, so that the motor connections are altered when no current is flowing in their armatures. If it is desired to alter the direction of running of the locomotive from the forward to backward, or vice versa, the reversing-switch is now turned from one position to the other, while the starting-switch is in the "stop" position and the armatures are not carrying current.

Our invention can be applied in various ways, and in the drawings we show, by way of example, an arrangement of three switches on parallel shafts adapted for a four-motor equipment. Each of these shafts carries upon it, but insulated from it, a number of metal pieces which as the shaft is rotated make contact with suitable fixed metal contact parts connected to the motor resistances and other parts of the circuit. As, however, the construction of these contacts forms no part of our invention, they are shown in the drawings with as little detail as possible.

Figure 2:
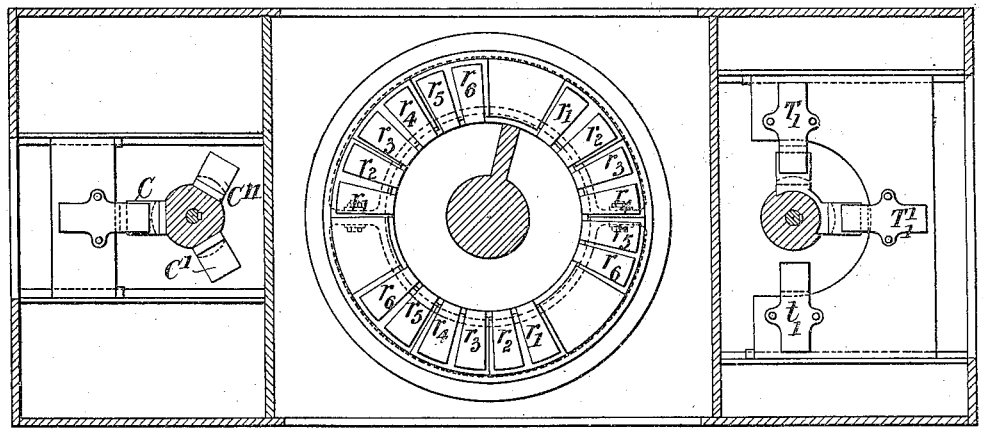
Figure 3:
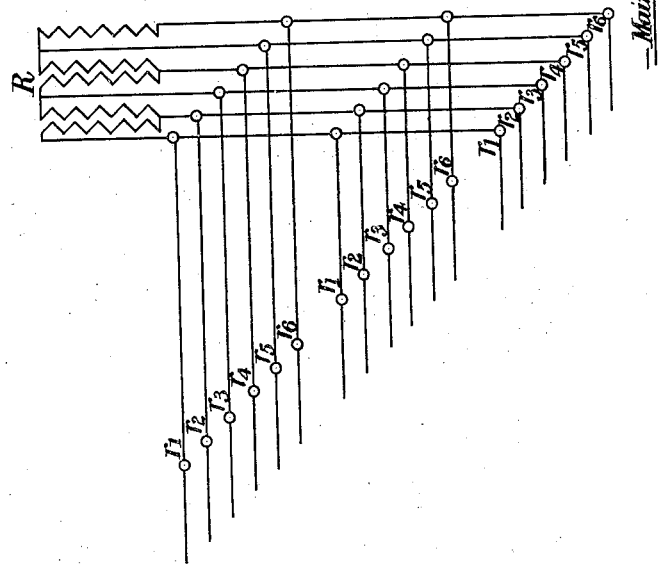
Figure 3:
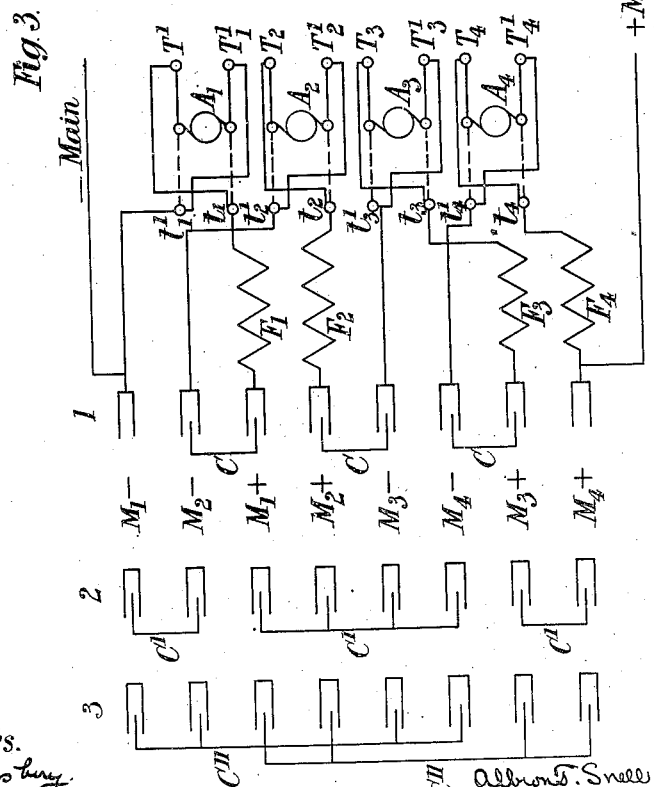

In the drawings, Figure 1 is a sectional elevation of the three switches with the interlocking-gear, the central switch being the starting-switch, that on the left-hand side the controlling-switch, and that on the right-hand side the reversing-switch. Fig. 2 is a plan of the electrical contacts of the switches, respectively. Fig. 3 is a diagram of the electrical connections simplified for the present purpose. Fig. 4 is a plan of the operating-handles of the switches. Figs. 5 and 6 show, respectively, a plan and elevation of the interlocking-gear.

Corresponding parts in the several views are lettered and numbered alike.

$A_1$ $A_2$ $A_3$ $A_4$ are the armatures, and $F_1$ $F_2$ $F_3$ $F_4$ the field-magnets, of the motors, respectively. $M_1^-$ is the main negative terminal, and $M_1^+$ the main positive terminal, of No. 1 motor, $M_2^-$ and $M_2^+$ the corresponding main terminals of No. 2 motor, and so on.

$T_1$ $T_1'$ are the terminals to which the armature of No. 1 motor is connected through the reversing-switch corresponding to, say, the forward direction of motion, $t_1'$ $t_1$ being the terminals to which this armature is connected for, say, the backward direction of motion, $T_1'$ in the reversing-switch, Fig. 2, taking the place of both $T_1'$ and $t_1'$ in the general diagram. Similar sets of connections for the other motors are also provided in the reversing-switch.

RH is the handle of the reversing-switch, and $s_1$ $s_2$ stops limiting the range of movement of the said handle.

K is a squared block upon the handle of the reversing-switch moving between springs $k$ $k$, which compel it to move quickly from one position to the other and prevent it staying in an intermediate position.

C C C are contact-bars on the cylinder of the controlling-switch, which make contact with the motor-terminals $M_1$ $M_2$, &c., in such a way as to couple the motors four in series.

C' C' are corresponding bars which couple the motors two in series and two in parallel, and $C^{11}$ $C^{11}$ are the bars which couple the motors four in parallel.

$G_1$ and $G_2$ are elements of the interlocking mechanism, the said elements being a modification of the well-known Geneva stop-wheels. The element $G_1$, which is the driver, is provided with teeth $g'$ and the element $G_2$ with corresponding recesses $g^2$. The element or wheel $G_1$ has three teeth and the element or wheel $G_2$ eight recesses; but we do not limit ourselves to this numerical relation between the wheels $G_1$ $G_2$. The wheel $G_1$ is rigidly connected to the spindle of the starting-switch, so as always to occupy a definite position in relation to the position of the handle SH. Keyed to the same spindle as the wheel $G_2$ is a toothed wheel $W_1$, which engages with a toothed wheel $W_2$, which is keyed to the spindle of the controlling-switch.

$D_2$ is a locking-disk with two segments removed, as at $d^2$ $d^2$, and which is keyed to the spindle of the reversing-switch. $D_1$ is a similar disk with one segment removed, as at $d'$, which engages with the disk $D_2$ in such a way that when the recess in the disk $D_1$ is opposite one of the recesses in the disk $D_2$, as shown in Fig. 5, the reversing-switch is free to move from the forward position to the backward position, or vice versa, but in other positions of the disk $D_1$ is not able to do so. The disk $D_1$ is rigidly connected to a toothed wheel $W_3$, mounted upon the same axis, and engages with the wheel $W_3$.

The operation of the apparatus hereinbefore described is as follows: Let us suppose that the starting-switch is in the "off" position, when, as previously explained, the locking-disks $D_1$ and $D_2$ will be so situated in relation to one another as to enable the reversing-switch to be operated by the handle RH, that a tooth upon the wheel G' is just emerging from a recess on the wheel $G_2$, and that the wheel $W_2$ is in such position that the contact-bars C C C engage with the fixed contacts of the controlling-switch, so as to connect the motors four in series, as illustrated in column 1 of the contacts, Fig. 3. If now the wheel SH of the starting-switch is moved through a third of a revolution, it slides over the contacts $r_1$ $r_2$ $r_3$ $r_4$, &c., (of which there may be any number,) and cuts out resistance from the rheostat R, Fig. 3, thus bringing a tooth upon the wheel $G_1$ to a position of engagement with the wheel $G_2$ and driving the said wheel through a portion of a revolution less than one-third. (With the arrangement shown in the drawings, Fig. 5, the wheel $G_2$ moves one-eighth of a revolution.) The wheel $W_1$ also moves through the same angle; but the diameters of the wheels $W_1$ and $W_2$ are so proportioned that the angular movements of the wheel $W_2$ correspond with those of the wheel $G_1$, and therefore with that of the wheel SH. Hence the controlling-switch is moved a third of a revolution, (whereby the contact-bars C' C' couple the motors two in parallel and two in series, as in column 2, Fig. 3,) the current being cut off from the motor-armatures just before the change of connections is made and being reëstablished immediately afterward, as previously described. During the movement before described the wheels $G_2$, $W_1$, and $W_2$, owing to the curvature of the surfaces of $G_1$ and $G_2$, remain fixed in position, being unable to move either backward or forward. This state of rest of the wheels $G_2$, $W_1$, and $W_2$ continues until the next tooth of the wheel $G_1$ engages with the wheel $G_2$, when the controlling-switch is moved to cause the contact-bars $C^{11}$ $C^{11}$ to make contact, as shown in column 3, Fig. 3, and connect the four motors in parallel. The last third of the movement of the wheel $G_1$ brings the wheel $W_2$, and consequently the controlling-switch, to the starting position, in which the four motors are in series, after the starting-switch has broken the circuit. Thus when the wheels SH and $G_1$ have made a complete revolution the disk $D_2$ is once more set free to move and everything is ready to repeat the cycle of operations.

RP is a ratchet and pawl arranged to prevent the wheels SH and $G_1$ from moving backward.

The stop-wheels $G_1$ $G_2$ might be omitted and the motion of the controlling-switch obtained directly from the motion of the starting-switch by toothed wheels alone; but in this case the controlling-switch would be continuously moving while the starting-switch is moving, and we think it very desirable to prevent this by the employment of the stop-wheels $G_1$ $G_2$, so as to allow the controlling-switch to have a step-by-step movement with intervals of rest.

To further facilitate the control of the speed of the vehicle, the teeth on the ratchet-wheel may be removed over those portions of the circumference corresponding to the periods of rest of the controlling-switch, so that while the controlling-switch is at rest upon a given combination the starting-switch handle may be removed either backward or forward to insert or remove resistance and so facilitate adjustment of speed.

It may be preferred by some persons to vary the windings of the field-magnets of the motors or to wholly or partially short-circuit the motors before altering the combinations by the controlling-switch. If this is done, additional contacts suitably connected would be provided in the controlling-switch; but they are omitted from the present scheme of connections as being not material to the present invention.

It is to be understood that the spindles of the three switches may be arranged either vertically or at any other angle, also that the handles and locking-gear may be at a distance from the actual contacts and current-carrying parts of the switches, though geared with them.

The switch-contacts are preferably mounted on separate blocks of marble or other insulating material arranged to slide between suitably-placed guides in the switch-cases, so that they may be separately removable for repair or renewal.

Although we have described our invention as applied in connection with motors for locomotive or tractive purposes, it will be obvious that it may also be used in connection with a series of motors for other purposes.

Having now particularly described and ascertained the nature of our said invention and in what manner the same is to be performed, we declare that what we claim is—

1. The combination with a switch for opening and closing an electric circuit, of a second switch carrying two or more series of contacts for the purpose of distributing the current flowing through the said circuit in various manners through subsidiary circuits, and of a third switch having contacts for reversing the direction in which the current flows through the circuits connected with it, the last-mentioned switch being interlocked with the first-mentioned switch in such a manner that it can only be moved when the latter is in the "off" position while the second switch is designed to receive its motion from the first switch through gearing in such a manner that when the first switch is in a position to allow the passage of a current through it the second switch is in position to distribute the current through one or other of its sets of contacts, substantially as described.

2. A compound switch comprising among its members, a starting-switch and a controlling-switch for coupling the motors in different relations, and mechanism for imparting an intermittent movement to the controlling-switch from the starting-switch, substantially as described.

3. A compound switch comprising among its members, a starting-switch, a controlling-switch for coupling the motors in different relations, mechanism for imparting an intermittent movement to the controlling-switch from the starting-switch, and a reversing-switch independent of the controlling-switch and interlocked with the starting-switch, substantially as described.

4. A compound switch comprising among its members, a starting-switch provided with a series of sets of resistance-contacts, a controlling-switch for coupling the motors in different relations, and mechanism for imparting an intermittent movement to the controlling-switch from the starting-switch while the latter is passing from one set of contacts to another, substantially as described.

5. A compound switch comprising among its members, a starting-switch provided with a series of sets of contacts, a controlling-switch for coupling the motors in different relations, mechanism for imparting an intermittent movement to said controlling-switch from the starting-switch, while the latter moves from one set of contacts to another, and a reversing-switch independent of the controlling-switch and interlocked with the starting-switch, substantially as described.

6. A compound switch comprising among its members, a starting-switch provided with a series of contacts, a gear-disk having concentric rests and operating-teeth, and a controlling-switch provided with a series of sets of contacts and with a gear-disk having inwardly-curved portions to engage the said concentric rests and recesses to engage the said operating-teeth, substantially as described.

7. A compound switch comprising among its members, a starting-switch provided with a series of contacts, and a driving-shaft having a driving-disk provided with concentric rests and operating-teeth, a controlling-switch for coupling the motors in different relations having a gear-disk provided with inwardly-curved faces to engage said concentric rests and recesses to engage said operating-teeth, a reversing-switch provided with a segmental locking-recess, and a locking-disk operatively connected with the shaft of the starting-switch provided with a segmental locking-recess, substantially as described.

8. A compound switch comprising among its members, a starting-switch provided with a plurality of sets of contacts arranged in a circle, with an "off" space between adjacent sets, a controlling-switch provided with a plurality of sets of contacts for coupling the motors in different relations, and gearing operatively connecting said starting-switch with the controlling-switch and so constructed that the controlling-switch will be moved from one set of contacts to another while the starting-switch is in one of its off positions, substantially as described.

9. A compound switch comprising among its members, a starting-switch provided with a plurality of sets of contacts arranged in a circle, with an "off" space between adjacent sets, a controlling-switch provided with a plurality of sets of contacts for coupling the motors in different relations, and gearing operatively connecting said starting-switch with the controlling-switch and so constructed that the controlling-switch will be moved from one set of contacts to another while the starting-switch is in one of its off positions, and means for preventing the reversing of the direction of movement of said starting-switch, substantially as described.

ALBION THOMAS SNELL.
CHARLES EDWARD GROVE.

Witnesses:
G. F. REDFERN,
JOHN E. BOUSFIELD.